United States Patent [19]

Urciuoli et al.

[11] 4,060,814
[45] Nov. 29, 1977

[54] RECORDER WITH EDGE-GUIDED BELT

[75] Inventors: John P. Urciuoli; Roger P. Icart, both of Portsmouth, R.I.

[73] Assignee: Raytheon Company, Lexington, Mass.

[21] Appl. No.: 635,207

[22] Filed: Nov. 25, 1975

[51] Int. Cl.² .......................................... G01D 15/16
[52] U.S. Cl. ................................ 346/139 A; 346/155
[58] Field of Search ........................ 346/139 A, 155

[56] References Cited

U.S. PATENT DOCUMENTS

| 2,639,211 | 5/1953 | Hallden et al. | 346/139 A |
| 2,723,897 | 11/1955 | Zabriskie | 346/139 A |
| 3,121,138 | 2/1964 | Murphy | 346/139 A |
| 3,586,774 | 6/1971 | Brouwer et al. | 346/139 A X |
| 3,588,343 | 6/1971 | Brouwer et al. | 346/139 A X |
| 3,683,412 | 8/1972 | Priessnetz | 346/139 A |
| 3,707,601 | 12/1972 | Goble | 346/139 A X |
| 3,757,352 | 9/1973 | Murray et al. | 346/139 A UX |
| 3,797,023 | 3/1974 | Shaler et al. | 346/139 A |

*Primary Examiner*—George H. Miller, Jr.
*Attorney, Agent, or Firm*—David M. Warren; Joseph D. Pannone; Milton D. Bartlett

[57] ABSTRACT

A recorder in which a stylus assembly is transported across a recording medium at increased speeds by a flexible non-extensible belt having its edges slidably nested within slots oriented transversely of the recording medium. The belt has molded teeth for accurate mating with a sprocket drive.

13 Claims, 9 Drawing Figures

RECORDER WITH EDGE-GUIDED BELT

BACKGROUND OF THE INVENTION

Recorders have been used for recording a wide range of data such as sonar sounding and biological phenomena. The recorders typically comprise a recording medium in the form of electro-sensitive paper carried out between reels which store and position the paper, the data being presented on the paper by a series of markings imprinted thereon by a stylus which is energized by electrical signals. Typically, the paper comprises an inner layer of electrically conductive material enclosed within an outer layer which is burned away or vaporized by electrical signals passing from the stylus to the inner conductive layer. The outer layer may be of a whitish color while the electrically conductive layer may be black or gray so that the burning away or vaporizing of the outer layer leaves the inner layer exposed to show a marking by the stylus. In more recent applications for recorders, it has been desirable to use higher and higher recording speeds for a more effective presentation of data.

A problem arises in that with the higher recording speeds, the stylus assembly is transported across the recording medium at such high speeds that vibrations have been introduced into the movement of the stylus with the result that with high speed recordings made by recorders of the prior art, the markings on the recording medium become increasingly less precise as the recording speed is increased. The vibrations result from the structure of the transport mechanisms utilized in passing the stylus along the electro-sensitive paper, removing the stylus from the paper, and returning the stylus to the starting position for the next trace across the paper.

SUMMARY OF THE INVENTION

The aforementioned problems are overcome and other features are accomplished by a recording system, in accordance with the invention, which provides for the transporting of a stylus assembly across a recording medium by means of a non-extensible, flexible belt to which the stylus assembly is affixed, the belt being positioned by means of a pair of slots running longitudinally of the belt, with opposite edges of the belt being slidably nested within the slots. The slots are formed within a guide structure and run transversely from the paper of the recording medium and at fixed distances therefrom to accurately position the belt and the stylus assembly carried by the belt relative to the paper. The belt is formed with molded teeth for accurate mating with sprocket drive wheels positioned at the termini of the slots.

The belt is fabricated from a flexible material having sufficient tensile strength to prevent its elongation from centrifugal forces encountered in passing around the sprocket drive wheels, the material also being characterized by dimensional stability at temperatures sufficiently high to permit the molding of teeth to the belt. One such material, a polyimide film, having one of the highest tensile strengths of plastic films, is manufactured under the trademark "KAPTON," by E. I. duPont and Company of Wilmington, Delaware, as disclosed in the U.S. Pat. No. 3,825,162 which issued to L. J. Hubbard on July 23, 1974. The teeth are molded to the belt in a manner taught by the aforementioned Hubbard patent. The teeth may be made of a low friction material, such as the nylon disclosed in the aforementioned Hubbard patent, or, as has been utilized in one embodiment of the invention, a low friction material comprising a polycarbonate thermoplastic resin reinforced with glass fibers and impregnated with polyfluorinated ethylenepropylene, such as that marketed under the trade name of "TEFLON FEP," by the aforementioned duPont. The glass fiber content is approximately 20% by weight with the TEFLON content being approximately 22% by weight. Because of the relatively high tensile strength and low density of the belt, centrifugal forces resulting from the passage of the belt around the sprocket wheels do not cause a lifting of the belt away from the sprocket wheels so that the belt is retained within its position.

The width of a slot is slightly greater than the width of the belt to prevent binding of the belt within the slots, the width of the slots being sufficiently small to prevent the generation of longitudinal waves along the belt. Such waves are believed to induce a transverse motion of the stylus assembly and the stylus contained therein and, therefore, decrease the precision of stylus markings on the paper. The nesting of the belt within the relatively narrow slots thereby prevents the build-up of the longitudinal waves and greatly improves the precision of the markings at the increased speed of transport of the stylus across the paper. This construction permits stylus speeds well in excess of 100 inches per second. The stylus assembly includes a tube in which the stylus is held under a slight spring pressure against the paper, the tube being lightly pressed against the guide structure with a resultant slight bowing of the belt by a pulling of the belt against the forward edges of the slots. The bowing produces a geometry of the belt which further inhibits any vibratory motion of the stylus.

BRIEF DESCRIPTION OF THE DRAWINGS

The aforementioned aspects and other advantages of the invention are explained in the following description taken in connection with the accompanying drawings wherein.

DESCRIPTION OF THE PREFERRED EMBODIMENT

Figure 1:
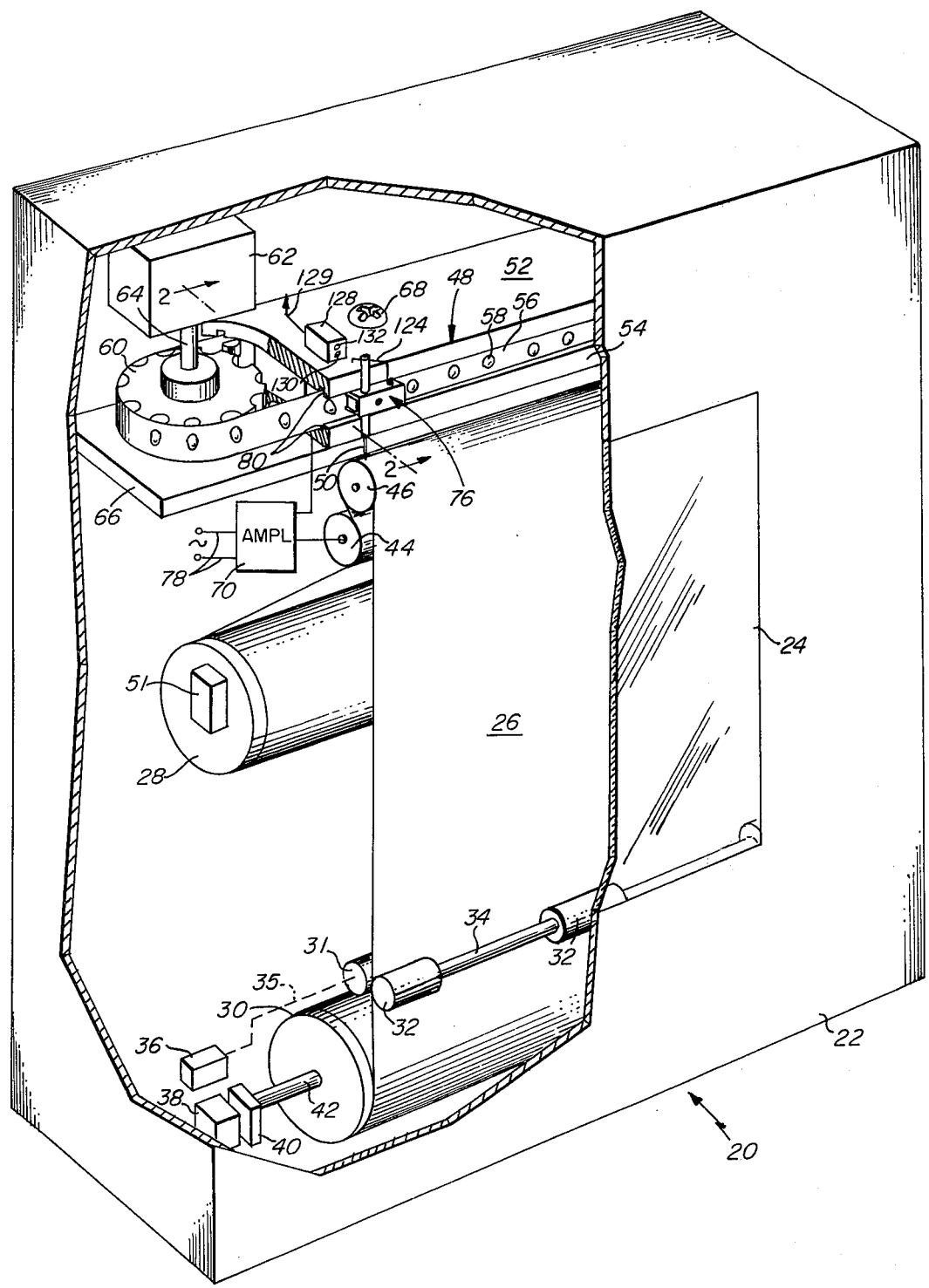
FIG. 1 is an isometric view of a recorder, partially cut away to show a stylus assembly and transport mechanism including a belt guide of the invention.

Referring now to FIG. 1, there is seen an isometric view of a recorder 20 which is partially cut away to shown the interior portions thereof. The recorder 20 comprises a case 22 having a window 24 through which a paper 26, which serves as a recording medium, may be viewed. The paper 26 is stored on a supply roll 28 from which it is unrolled to pass in a downward direction towards a take-up roll 30. The paper 26 is pulled in the downward direction by means of a roller 31 which presses the paper 26 against rubber idler rollers 32 affixed to a shaft 34. The roller 31 has a sandblasted finish for increased frictional contact with the paper 26 and is mechanically coupled by a line 35 to a stepping motor 36. A motor 38 is coupled via a slip clutch 40 and a shaft 42 to the takeup roller 30 for imparting rotation thereto for winding up the used portion of the paper 26. The paper 26 is guided from the supply roll 28 by a stationary cylinder 44 and a roller 46, the latter being placed adjacent a stylus transport 48 for supporting a portion of the paper 26 within the path to be traveled by a stylus 50. A brake 51 attached to the supply roll 28 imparts a drag thereto to keep the paper 26 taut. The brake 51 as well as the motors 36 and 38 are held in position by a suitable supporting frame not shown in the figure.

In accordance with the invention, the stylus transport 48 comprises an upper guide 52, a lower guide 54, a belt 56 having teeth 58, a sprocket wheel 60 having cogs which mate with the teeth 58 of the belt 56, and a motor 62 coupled via a shaft 64 to the sprocket wheel 60 for imparting rotation thereto. A frame member 66 supports and positions the sprocket wheel 60 and the lower guide 54, the upper guide being affixed to the lower guide 54 by means of a screw 68.

Figure 2:
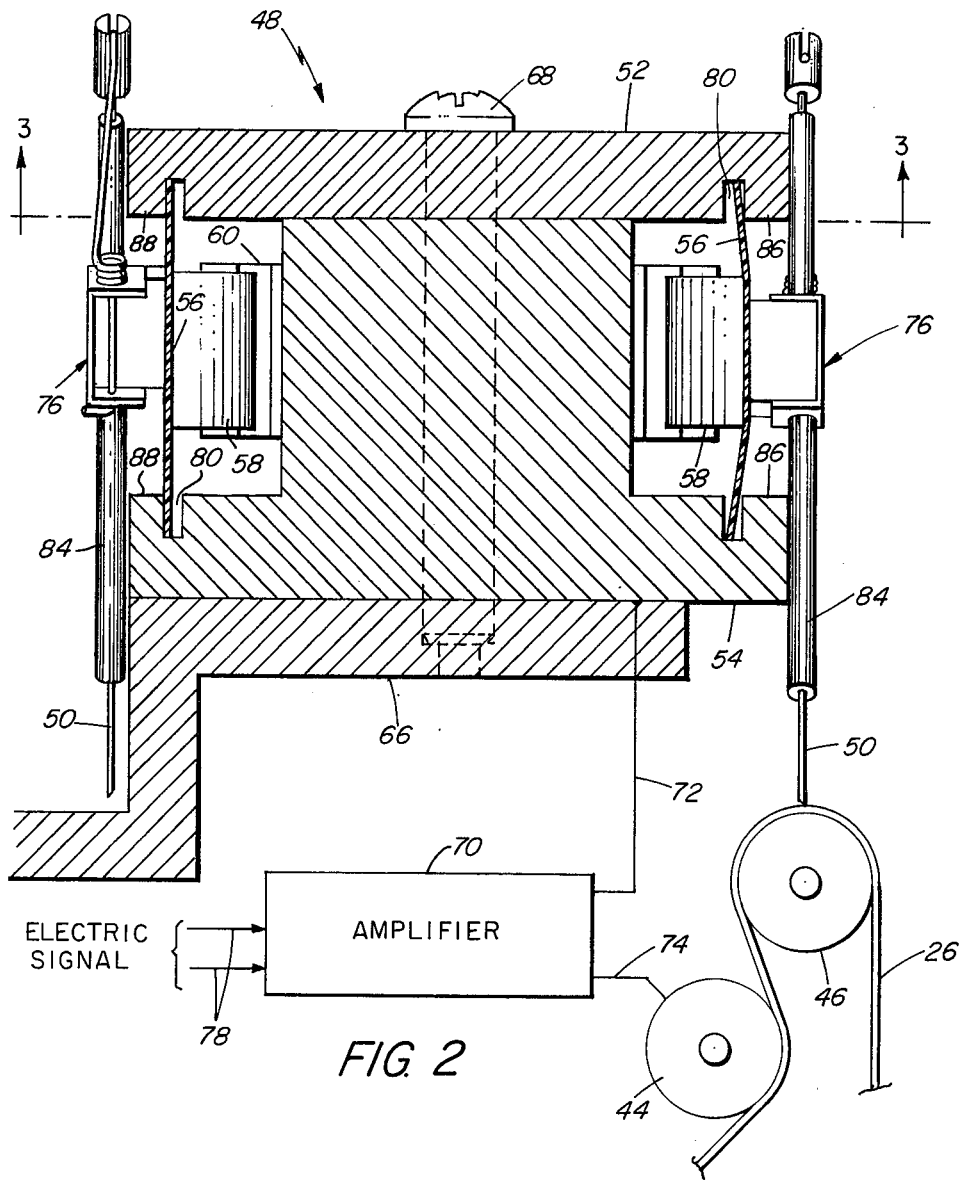
FIG. 2 is an end view of the guide taken along the lines 2—2 of FIG. 1.

Referring also to FIG. 2, there is seen an end view of the upper and lower guides 52 and 54. A second sprocket wheel 60, on the right hand side of the recorder 20, not seen in FIG. 1, is shown in FIG. 2. Electrical signals are coupled from an amplifier 70 to the lower guide 54 via line 72 and to the cylinder 44 via line 74. The guides 52 and 54 as well as the cylinder 44, the stylus 50, and a stylus assembly 76 which positions the stylus 50 on the paper 26, are all fabricated from metallic electrically conducting material to provide an electric circuit in combination with the paper 26, which is electrically conducting, for coupling electrical signals of the amplifier 70 to the paper 26. An input electrical signal from a source such as a sonar receiver or a medical transducer is applied via lines 78 to the amplifier 70 which then amplifies the signals to a value of, typically, a few hundred volts, most of that voltage appearing across the junction of the stylus with the paper 26. A second stylus assembly 76 is seen on the left side of the figure behind the guides 52 and 54. In one embodiment of the invention, the belt 56 is sufficiently long to accommodate three stylus assemblies 76 which are equally spaced along the belt 56 with a spacing approximately equal to the width of the paper 26.

As was noted hereinabove, the paper 26 is typically constructed of laminae in which an inner layer having a relatively dark color is electrically conducting. An outer layer, which may be white or other light color, is vaporized or burnt off by the voltage at the point of contact of the stylus 50 with the paper 26.

Figure 3:
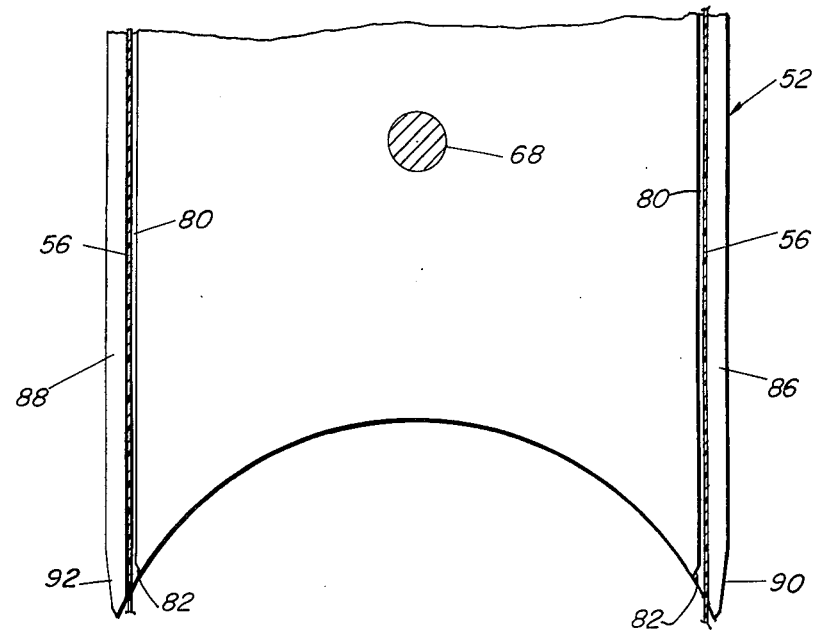
FIG. 3 is a plan view of the portion of a guide showing slots therein for guiding a belt as seen along lines 3—3 of FIG. 2.

Referring now to FIGS. 1, 2, and 3, the belt 56 is nested within slots 80 located near the periphery of the upper and lower guides 52 and 54. The plan view of FIG. 3 taken along the lines 3—3 of FIG. 2 presents a detailed view of the slots 80 at one end of the upper guide 52. The slots 80 have a width slightly larger than the depth of the belt 56 to permit free movement of the belt 56 through the slots 80. The depth of each slot 80, as seen in FIG. 2, is great enough to envelop only the edges of the belt 56, the remaining portion of the belt 56 being free of the slots 80 so as to accommodate the teeth 58 and the stylus assembly 76. As seen in FIG. 3, the inner aspect of the slot 80 has a flared terminus 82 to facilitate entry of the belt 56 from the sprocket wheel 60 into the slot 80.

The stylus assembly 76 includes a hollow tube 84 in which the stylus 50 is slidably secured. As the belt 56 passes through the slots 80, the stylus assembly 76 pulls the tube 84 and the mid-portion of the belt 56 together against lips 86 on the front edges of the upper and lower guides 52 and 54 resulting in a bowing of the belt 56. The outer edge of each lip 86 is preferably plated with a nickel-boron plating to reduce friction between the lips 86 and the tube 84 as well as to promote electrical conduction therebetween. The outer surface of the belt 56 is preferably coated with a relatively thin film of polytetrafluoroethylene (sold under the trade name of TEFLON by the aforementioned duPont) to reduce friction between the belt 56 and the lips 86. A lip 88 at the rear edges of the guides 52 and 54 is narrower than the front lip 86 and, therefore, does not produce the bowing of the belt 56 on the rear side of the stylus transport 48. To facilitate entry of the front lips 86 between the belt 56 and the tube 84, the front lip 86 has a tapered terminus 90, seen in FIG. 3, which eases the stylus assembly 76 into contact with the front surface of the lip 86 as it travels from the sprocket wheel 60 to the front edges of the guides 52 and 54. A tapered terminus 92 is also provided for each of the rear lips 88 of the guides 52 and 54 to ensure smooth passage of the stylus assembly 76 from the sprocket wheel 60 to a position behind the rear edge of the guides 52 and 54. As seen in FIG. 2, the tube 84 passes by the rear lips 88 without contact therewith.

Figure 4:
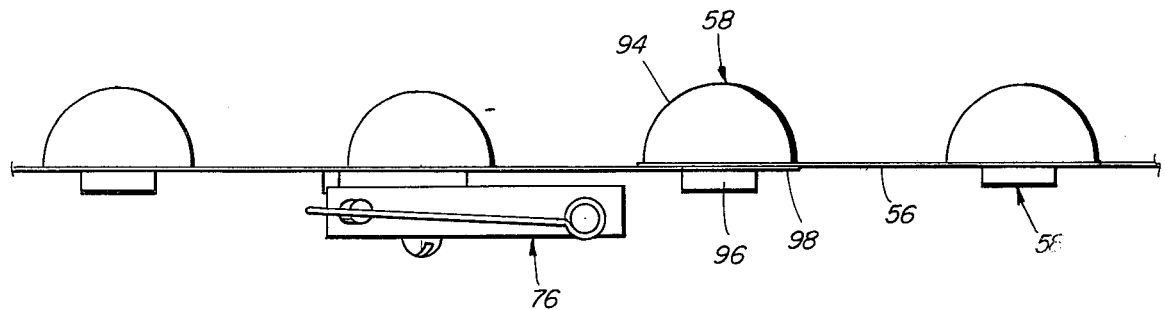
FIG. 4 is an edge view of the belt of FIGS. 1 and 2 showing teeth for engagement with a sprocket drive of FIG. 1, and a top view of the stylus assembly of FIG. 1.

Referring now to FIG. 4, there is seen an edge view of the belt 56, previously seen in FIGS. 1 and 2, and corresponds to a view of the belt 56, as seen by sighting along a line parallel to the axis of the sprocket wheel 60 of FIG. 1. FIG. 4 also shows the stylus assembly 76 and the teeth 58. A tooth 58 comprises a cylindrically shaped portion 94 wherein the cylinder axis is parallel to the axis of the sprocket wheel 60 of FIG. 1 for mating therewith. The tooth 58 also comprises a base portion 96 which is coupled through the belt 56 to the cylindrical portion 94, as will be seen subsequently in FIG. 5 for securely fastening tooth 58 to the belt 56. The aforementioned patent to Hubbard also discloses the manner by which the two ends of a strip of belt material are secured to form the belt 56 by means of a butt joint, such a joint being identified in the figure by the numeral 98 to aid in securing the ends of the belt 56.

Figure 5:
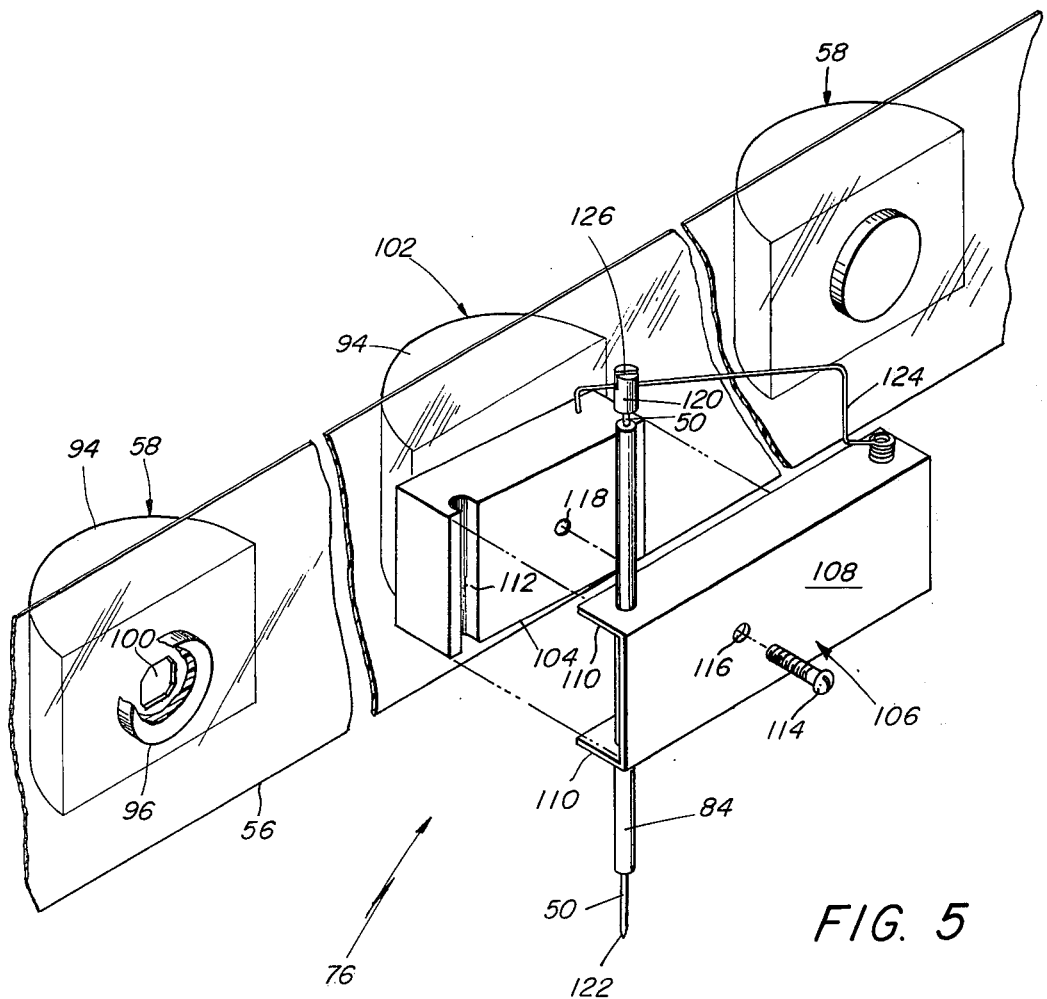
FIG. 5 is an isometric view exploded to show the component parts of the stylus assembly of FIG. 1 and its mounting to a tooth of the belt, the figure further showing a tooth which is partially cut away to expose an aperture within the belt through which the tooth is molded onto the belt.

Referring now to FIG. 5, there is seen an isometric view of a section of the belt 56 having a stylus assembly 76 affixed thereto, the stylus assembly 76 being shown in exploded view to disclose the manner of mounting the stylus assembly 76 to the belt 56. A tooth 58 is shown with its base portion 96 partially cut away to disclose an aperture 100 in the belt 56 through which the tooth 58 is molded in position on the belt 56. An alternate form of the tooth, identified by the numeral 102, has a cylindrically shaped portion 94 as does the tooth 58 for mating with the sprocket wheel 50 of FIG. 1, but has a base portion 104 of a generally rectangular configuration to provide a suitable mount for a shoe 106 of the stylus assembly 76.

As noted hereinabove, the teeth are made from a low friction material such as a reinforced polycarbonate resin. One such resin, a polycarbonate of 2,2'bis[4 hydroxyphenol] propane, is sold under the trade name "LEXAN" by the General Electric Company of New York, N.Y. The aforementioned reinforcing agents, fibers of glass and TEFLON FEP may be placed in the molten resin before the molding of the teeth, or the reinforced resin may be purchased under the trade name "POLYCARBAFIL," product number J-50/20//TF/22, from Fiberfill of Evansville, Indiana. A reinforced polycarbonate resin is also manufactured by LNP Corporation of Malvern, Pennsylvania.

The shoe 106 is constructed in the form of a channel having a top wall 108 and sidewalls 110 for enclosing the base portion 104. The tube 84 passes through apertures in the sidewalls 110 and is thereby secured to the shoe 106. The base portion 104 has a channel 112 into which the tube 84 is nested when the shoe 106 is placed upon the base portion 104. The shoe 106 is securely fastened to the base portion 104 by means of a screw 114, which passes through an aperture 116 in the shoe 106 and is threadedly secured within a tapped hole 118 in the base portion 104. The tapped hole 118 is sufficiently long to pass through the belt 56 so that the thread of the screw 114 engages both the base portion 104 and the cylindrically shaped portion 94. The base portion 104 is tilted approximately 5° relative to the axis of the cylindrically shaped portion 94 to impart a 5° tilt to the stylus 50 whereby a cap 120 at the top end of the stylus 50 leads the point 122 of the stylus 50 as it passes from left to right over the paper 26 of FIG. 1. The 5° tilt provides more precise control of the location of the point 122 upon the paper 26. As noted hereinbefore, the stylus 50 is slidably secured within the tube 84. The stylus 50 is urged gently against the paper 26 by means of a spring 124 secured at one end thereof to the shoe 106 and at the other end thereof by a slot 126 in the cap 120.

With respect to the aperture 100 in the belt 56, it is noted that the aperture 100 has a generally square shape to prevent rotation of the tooth 58, but further has rounded corners to provide stress relief to the belt 60 at the corners of the aperture 100. While the aperture 100 is shown with the tooth 58, a similar aperture, not seen in FIG. 5, is also provided for molding the tooth 102 to the belt 56. In the case of the tooth 102, the aperture 100 has a diagonal sufficiently long to provide adequate room for inserting the screw 114 therethrough without fracturing the tooth 58 in its neck portion which passes through the aperture 100.

In operation, therefore, electrical signals applied to the amplifier 70 are amplified to a voltage suitable for marking the paper 26 and presented to the paper 26 by the stylus 50 and the cylinder 44. The stylus 50 is transported via the stylus assembly 76 across the paper 26 and in contact with the paper 26 along a path atop the roller 46. The stylus 50 is urged towards the roller 46 by the spring 124 for applying light pressure to the paper 26 to ensure electrical contact therewith. Markings appear on the paper 26 having intensities commensurate with the magnitude of the voltage impressed by the stylus 50. The belt 56 carries the stylus assembly 76 and is driven by the sprocket wheel 60 while being accurately positioned by the slots 80 to ensure that the stylus 50 precisely positions marks upon the paper 26.

In accordance with the invention, the belt 56 is fabricated of a high tensile strength material to ensure that it is dimensionally stable in its longitudinal direction. While the belt 56 may be made of steel, the aforementioned polyimide film is preferred because of its superior resistance to fatigue. Therefore, as the bolt 56 speeds around the sprocket wheel 60, the belt 56 is not pulled away from the sprocket wheel 60 or elongated by the centrifugal force exerted upon the belt 56 and upon the stylus assembly 76. In this way, the sprocket wheel 60 serves as a guide for ensuring the precise position of the belt 56 as it exits from the cogs of the sprocket wheel 60 to enter the slots 80 of the upper and lower guides 52 and 54. The widths of the slots 80 are slightly larger than the thickness of the belt 56, to ensure that the belt 56 can pass through the slots 80 without binding therein, however, the widths of the slots 80 are sufficiently narrow to ensure the attentuation of any longitudinal wave which may build up along the belt 56 due to the high speed of the belt 56. The belt 56 has a width of one-half inch and a depth of 6 mils (thousands of an inch), five mils of KAPTON plus one mil layer of TEFLON. The guides 52 and 54 with their slots 80 permit belt speeds well in excess of 100 inches per second, a speed of 180 inches per second having been attained in the building of an embodiment of the invention, while the stylus 50 made markings with a precision better than 1/100 of an inch. To facilitate insertion of the belt 56 into a slot 80, the width of the slot 80 was enlarged, in one embodiment of the invention, to approximately 20 mils; however, it appears that this value of width should not be exceeded to ensure proper control of the movement of the belt 56 by the guides 52 and 54. The depth of a slot 80 is 55 mils and the belt 56 penetrates into the slot 80 to a depth of approximately 45 to 50 mils.

When it is desired to synchronize the position of the stylus 50 with an external system, an optional synchronizing signal generator 128 may be placed on the upper guide 52, as shown in FIG. 1 to provide an electrical signal via line 129 to the external system, the generator 128 comprising a lamp 130 and a photoelectric cell 132. As the stylus 50 passes by a beam of light transmitted by the lamp 130, a reflection from the stylus 50 is momentarily received at the photoelectric cell 132, which, in response to the reflected light, generates an electrical signal which indicates the instant of time when the stylus 50 intercepts the beam of light from the lamp 130.

Figure 6:
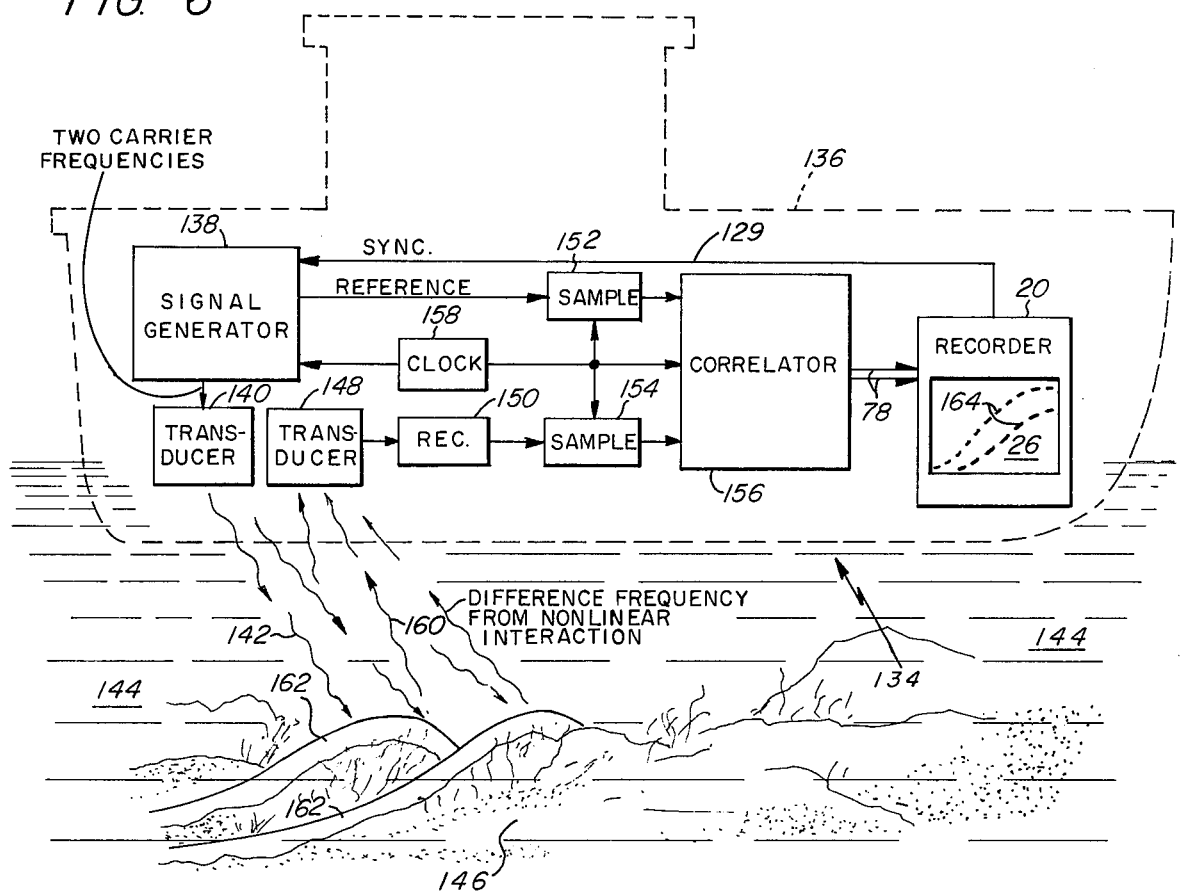
FIG. 6 is a block diagram of a sonar depth finding system incorporating the recorder of FIG. 1.

Referring now to FIG. 6, there is shown a sonar system 134 incorporating the recorder 20 of FIG. 1 and carried abroad a ship 136 shown in phantom. The system 134 functions in a manner similar to that of the system designated by the numeral 10 in FIG. 1 of the U.S. Pat. No. 3,786,405 which issued in the name of M. A. Chramiec et al on Jan. 15, 1974. The system 134 is seen to comprise a signal generator 138, a transmitting transducer 140 for transmitting sonic sound waves 142 into the ocean 144 towards the bottom 146 thereof, a receiving transducer 148 for receiving sound waves reflected from the ocean bottom 146, a receiver 150 for filtering and amplifying signals coupled thereto from the transducer 148, samplers 152 and 154, a correlator 156 and a clock 158 for providing timing signals for operating the generator 138, the samplers 152 and 154, and the correlator 156. The correlator provides signals to the recorder 20 via lines 78, the recorder 20 providing a synchronizing signal via line 129 to the generator 138.

As has been noted hereinabove, the recorder 20 provides increased accuracy and precision through the placing of markings on the paper 26 which serves as its recording medium. While sonar systems generally provide echoes having relatively low resolution data of objects submerged in the ocean 144, the system 134, as does the system of the aforementioned patent to Chramiec et al, provides data of reflecting objects in the ocean 144 with much increased resolution. The increased resolution is due to the utilization of a correlator and the utilization of the finite amplitude effect, or non-linear interaction, of two sound waves 142 of relatively high frequency which interact in the ocean 144 to produce a sound wave 160 having a frequency equal to the difference between the two transmitted frequencies. While the aforementioned patent to Chramiec et al contemplates the use of a one-bit correlator and one-bit sampling of the received echo, even better resolution can be obtained by a multiple bit correlator operating in conjunction with multiple bit sampling of the received echo. The use of a multiple bit correlator presents improved resolution over the use of a one-bit correlator particularly in the case of sloping bottoms or reflecting objects which are closely spaced in range from the ship 136 since, in these situations, the one-bit correlator tends to produce closely spaced output signals of reduced amplitude as is disclosed in a copending United States patent application entitled "Ranging System With Resolution of Correlator Ambiguities" by William R. Backman, Jr., Ser. No. 626,581, filed Oct. 28, 1975. Because of the increased resolution obtainable with a system such as the system 134, the recorder 20 is utilized rather than a recorder of the prior art in order to ensure that the echo signatures are portrayed with adequate resolution to ensure an accurate reproduction of the details of the reflecting objects in the ocean 144.

FIG. 6 depicts a situation in which the high resolution is advantageous. Two submerged telephone cables 162 are shown lying on the ocean bottom 146 with images 164 thereof being portrayed on the paper 26. The combination of the recording precision provided by the upper guide 52 and the lower guide 54 of FIGS. 1 and 2 in cooperation with the sampling and correlation of the sampler 154 and the correlator 156 produce an image on the paper 26 which has sufficient resolution and accuracy to portray reflecting objects in the ocean 144 which are of finer detail than has heretofore been possible.

In operation, the signal generator 138 is triggered by a synchronizing signal provided by the recorder 20 along line 129 and, in response thereto, provides simultaneously two electrical signals at two different carrier frequencies for conversion by the transducer 140 to the sound waves 142, the latter interacting in the manner aforesaid to produce the difference frequency wave 160 which is reflected from the telephone cables 162. The signal generator 138 also provides a reference signal having a carrier frequency equal to that of the sound wave 160. The generator 138 modulates the phase or frequency of one or both of the sound waves 142, that modulation appearing at the difference frequency of the wave 160. The sound wave 160 with the modulation thereon is converted by the transducer 148 to electrical signals which are filtered and amplified by the receiver 150 which then couples the signals to the sampler 154.

The bandwidth of the receiver 150 is sufficiently wide to preserve the modulation of the sound wave 160 while being sufficiently narrow to exclude noise generated within the ocean 144 and lying outside the bandwidth of the modulation.

The sampler 152 and the sampler 154 may be one-bit samplers as disclosed in the aforementioned patent to Chramiec et al in which case the correlator 156 is a one-bit correlator as disclosed in that patent, or alternately and preferably, the samplers 152 and 154 are each multiple bit samplers and the correlator 156 is, accordingly, provided with multi-stage recirculating shift registers for recirculating the multiple bit samples, the correlator 156 having multipliers for multiplying the recirculated multiple bit samples. The sampler 152 provides multiple bit samples of the reference signal for the correlator 156 in the same manner as the sampler 154 provides the multiple bit samples of the received signal for the correlator 156. The output signals of the correlator 156 are of suitable accuracy and have adequate resolution to produce the desired image 164 on the paper 26 of the recorder 20.

Figure 7:
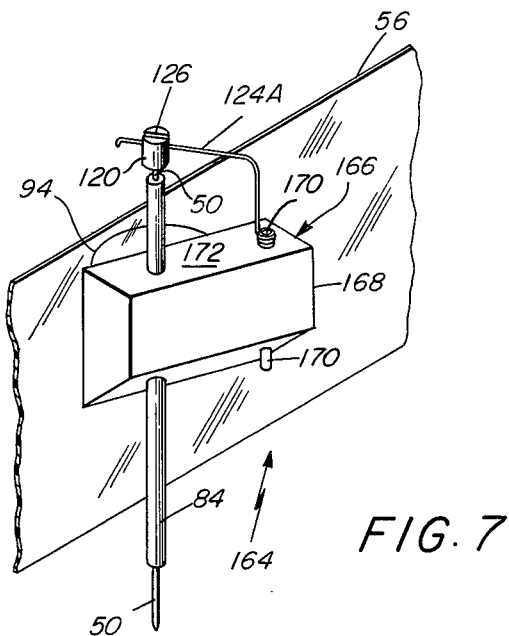
FIG. 7 is an alternative embodiment of the stylus assembly of FIG. 5.

Referring now to FIG. 7, there is shown an alternative embodiment of the stylus assembly 76 of FIG. 5, this alternative embodiment being identified by the numeral 164. The stylus assembly 164 comprises a tooth 166 having a cylindrically shaped portion 94, as does the tooth 102 of FIG. 5, and a base portion 168 integrally molded to the cylindrically shaped portion 94 in a manner similar to the integral molding of the base portion 104 of FIG. 5 to the cylindrically shaped portion 94 of FIG. 5. The tooth 166 is molded in a manner, to be described hereinafter with reference to FIGS. 8 and 9, in which the tube 84 (seen also in FIG. 5) and a tube 170 are positioned within the mold during the molding operation so that the tubes 84 and 170 become firmly embedded within the base portion 168 and are thereby rigidly secured to the belt 56, the tube 84 having the same orientation relative to the belt 56 as that previously disclosed in FIG. 5.

A spring 124A is secured to the upper end of the tube 170 and contacts the cap 120 of the stylus 50 as does the spring 124 of FIG. 5 for urging the stylus 50 downwardly towards the paper 26 of FIG. 1. The tube 84, being integrally molded to the base portion 168, serves as an extension thereof for precisely orienting the stylus 50, and also serves as a sleeve or liner to permit the sliding of the stylus 50 through the base portion 168. The base portion 168 has its sides, such as the side 172, tilted relative to a perpendicular direction from the belt 56 to shed dust-like particles which may be produced during the imprinting of markings on the paper 26 of FIG. 1 by the stylus 50.

Figure 8:
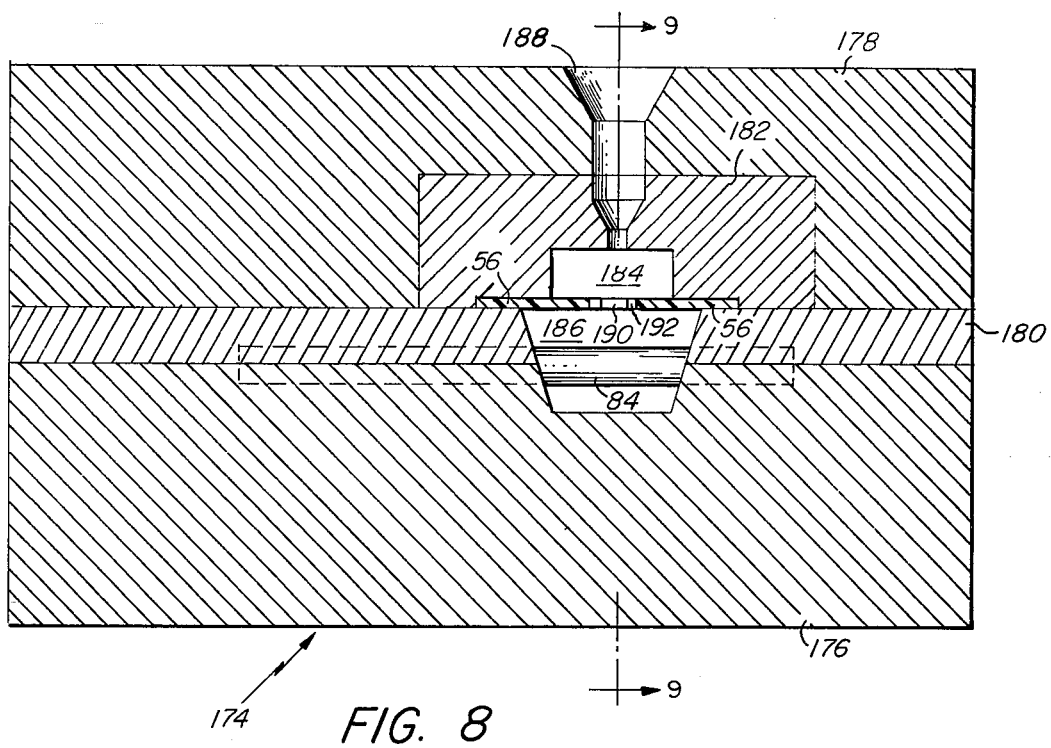
FIGS. 8 and 9 are sectional views, taken respectively along lines 9—9 and 8—8 in FIGS. 8 and 9, of a mold used in fabricating the stylus assembly of FIG. 7.
Figure 9:
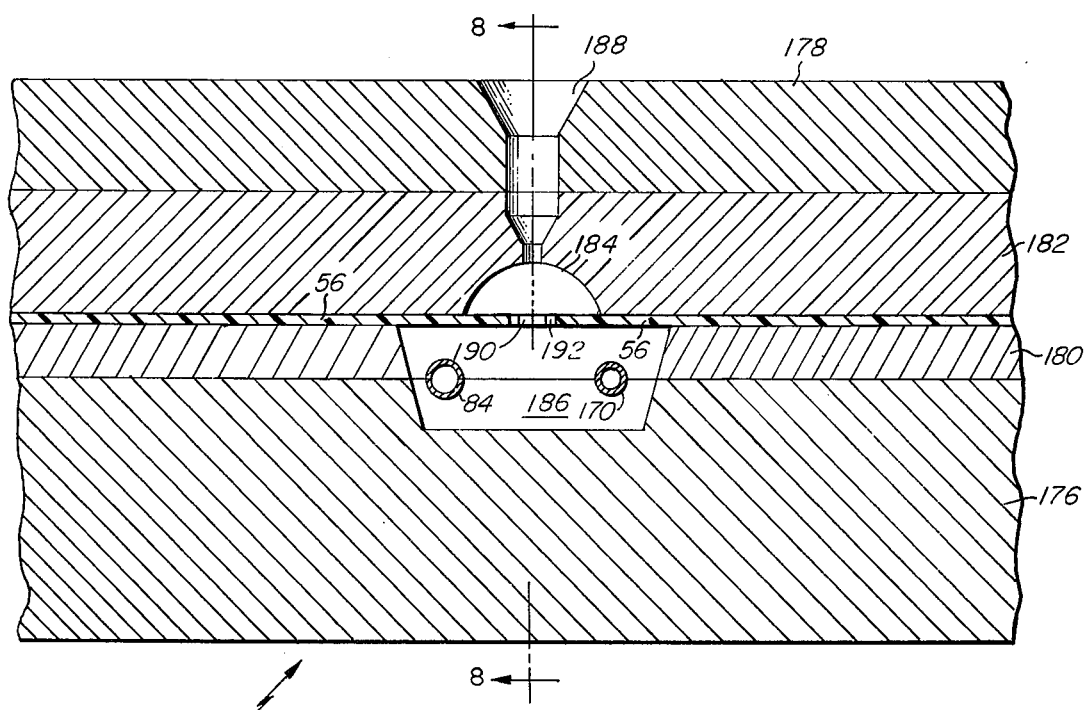

Referring also to FIGS. 8 and 9, there are seen sectional views of a mold 174 utilized in molding the tooth 166 to the belt 56 of FIG. 7. The mold 174 has a form similar to and functions in a manner similar to the mold disclosed in FIG. 11 in the aforementioned Hubbard patent. The mold 174 comprises a bottom member 176, a top member 178, a middle member 180, and a block 182. The belt 56 of FIG. 7 is seen positioned between the block 182 and the middle member 180. With respect to the tooth 166 of FIG. 7, the cylindrically shaped portion 94 is formed within an upper cavity 184 and the base portion 168 is formed within a lower cavity 186. The tubes 84 and 170 are seen to be nested between the middle member 180 and the bottom member 176, the tubes 84 and 170 passing through the lower cavity 186.

The material from the which the tooth 166 is to be formed is forced in a molten state through a passage 188 to the interior portions of the mold 174 to fill the upper and lower cavities 184 and 186 as well as a neck region 190 whereby the upper and lower cavities 184 and 186 are jointed through an aperture of the belt 56, the aperture having a shape similar to the aperture 100 of FIG. 5. A rounded corner 192 of the aperture of seen in the figures, the rounded corner 192 providing the stress release in the belt 56 disclosed previously with reference to FIG. 5.

The stylus assembly 164 of FIG. 7 is advantageous in that it permits more precise positioning of the stylus 50 than the embodiment disclosed in FIG. 5 since the tube 84 is positioned under the precise control of the mold 174. Thus, in the preferred embodiment of the recorder 20 of FIG. 1 wherein three styli 50 are transported by the belt 56, the successive traces produced by each of the styli 50 are more perfectly aligned by use of the stylus assembly 164 of FIG. 7. In addition, the stylus assembly 164 is more readily fabricated since it has fewer parts.

It is understood that the above described embodiment of the invention is illustrative only and that modifications thereof may occur to those skilled in the art. Accordingly, it is desired that this invention is not to be limited to the embodiments disclosed herein but is to be limited only as defined by the appended claims.

What is claimed:

1. A recorder comprising:
   a medium for inscribing a record;
   a stylus for stimulating said medium; and
   means for transporting said stylus along said medium, said transporting means including a belt having first and second edges thereof, a support having slots oriented transversely of said medium for slidably engaging said first and said second edges, and means for securing said stylus to said belt between said first and said second edges, said slots being configured to envelop only the edges of said belt, said securing means contacting said support, said securing means urging a mid-portion of said belt towards an edge of said support and providing a bowing of said belt to further stabilize said belt from longitudinal waves along said belt.

2. A recorder according to claim 1 wherein said securing means comprises a tubular member surrounding a portion of said stylus, shoe means for holding said tubular member at a predetermined angle relative to said recording medium, and means for affixing said shoe means to a tooth of said belt.

3. A recorder according to claim 2 wherein said tooth affixed to said shoe has a substantially rectangular base member configured to mate with said shoe.

4. A recorder according to claim 3 wherein said belt has apertures corresponding to the locations of each of said teeth, an individual one of said apertures having a generally square configuration for inhibiting rotation of a tooth about the said aperture, said aperture having rounded corners to relieve stresses in said belt.

5. A recorder according to claim 1 wherein said slots have a flared entrance to facilitate entry of said belt into said slots, said support being formed of metal, and said belt being formed of a polyimide film having a coating thereon to reduce friction between said belt and the walls of the said slots.

6. A recorder according to claim 5 wherein said support having said slots is provided with lips along side said slots, said stylus being provided with an encircling tubular member for slidably contacting said lips.

7. A recorder according to claim 6 wherein said electrical signals are propagated from said lips via said encircling tubular member to said stylus.

8. A recorder according to claim 1 wherein said slots are sufficiently narrow to permit nesting of said first and said second edges therein to attenuate the formation of longitudinal waves in said belt, said support being formed of metal, and said belt being formed of a polyimide film having a coating thereon to reduce friction between said belt and the walls of said slots.

9. A recorder according to claim 8 wherein said transporting means includes a drive wheel for said belt, said belt having sufficient tensile strength to retain said belt in contact with said drive wheel in the presence of centrifugal forces generated by a movement of said belt around said drive wheel.

10. A recorder according to claim 9 wherein said belt has teeth thereon, and wherein said drive wheel is a sprocket drive wheel having cogs for engagement with said teeth of said belt.

11. A recorder according to claim 10 wherein said teeth on said belt have a substantially cylindrical surface about a cylinder axis parallel to an axis of said drive wheel.

12. A transport assembly for a recording system comprising:
   a flexible belt;
   a stylus;
   a stylus support molded to said belt, said stylus support having an aperture therein through which said stylus is slidably positioned; and
   means for transporting said belt across a recording medium of said recording system whereby said stylus is positioned relative to said recording medium for imprinting marks thereupon, said transporting means including a support having slots therein for engaging first and second edges of said belt, said slots being configured to envelop only the edges of said belt, said securing means contacting said support, said securing means urging a mid-portion of said belt towards an edge of said support and providing a bowing of said belt to further stabilize said belt from longitudinal waves along said belt.

13. A recording system according to claim 12 wherein said aperture within said molded stylus support has a tubular liner passing through said aperture and surrounding said stylus to permit sais stylus to be slidably positioned relative to said molded stylus support, said support being formed of metal, and said belt being formed of a polyimide film having a coating thereon to reduce friction between said belt and the walls of said slots.

* * * * *